United States Patent [19]

Kummer

[11] Patent Number: 4,715,405

[45] Date of Patent: Dec. 29, 1987

[54] SOLENOID VALVE, PARTICULARLY FOR APPARATUS FOR REMOVING A MILKING SET

[75] Inventor: Jan Kummer, Leeuwarden, Netherlands

[73] Assignee: Kummer Electronics B.V., Leeuwarden, Netherlands

[21] Appl. No.: 28,258

[22] Filed: Mar. 20, 1987

[30] Foreign Application Priority Data

Mar. 27, 1986 [NL] Netherlands ...................... 8600802

[51] Int. Cl.⁴ .................... F16K 11/074; F16K 15/18; F16K 31/02
[52] U.S. Cl. .............................. 137/625.2; 137/614.2; 137/625.45; 251/68
[58] Field of Search .................... 251/68, 69, 299, 300, 251/228, 65; 137/625.2, 625.45, 614.2

[56] References Cited

U.S. PATENT DOCUMENTS 1,291,987  1/1919  Mapel ..................................... 251/68
1,400,551  12/1921  Hornbeck ......................... 137/625.2
4,469,304  9/1984  Kah, Jr. .................................. 251/65

*Primary Examiner*—Arnold Rosenthal
*Attorney, Agent, or Firm*—Murray Schaffer

[57] ABSTRACT

This valve may be used for operating a removing apparatus for a milking set. It has such low energy comnsumption, that simple batteries may be used so that a cow-shed need not be provided with electric current conduits. It is characterized in that the valve (7) is a three-way valve and the valve carrier (6) is adapted to be moved by hand (22) against the force of the spring (18) into the closed valve position, in which the permanent magnet (14) is retained under the influence of the soft iron core (15) of the solenoid (15, 16), the fluid conduits (4, 5) opening into apertures (2, 3) in a planar surface of a connection block (1) and the valve body (7) being cup shaped of such dimensions and shape that it mutually communicates in the other valve position the outlet apertures (2, 3) while sealing with the planar surface, the valve carrier being a lever (6), which is rotatable around a pivot (13) provided in the connection block (1), the valve body (7) being secured to said lever adjacent to its pivot (13), the permanent magnet (14) being secured to the end of the lever (6) which is remote from the pivot (13).

7 Claims, 4 Drawing Figures

SOLENOID VALVE, PARTICULARLY FOR APPARATUS FOR REMOVING A MILKING SET

The invention relates to a valve for opening and closing respectively the communication between at least two fluid carrying conduits, in which different pressures prevail, said valve having a valve body connected to a valve carrier and being movable in two positions, the valve carrier being biased by a spring and carrying a permanent magnet, which in the one valve position is retained by the soft iron core of the solenoid, the solenoid coil being adapted to be supplied with a current pulse such that it repulses the permanent magnet so that under the influence of the spring the valve carrier is moved against an abutment in the other valve position.

Such a valve is known from the U.S. Pat. No. 4,469,304. This valve has a low power comsumption due to the use of a capacitor in the actuation circuit of the solenoid. However, this valve is a two-way valve which cannot be used for a removing apparatus.

The invention aims at providing a valve of the type as mentioned in the introduction which is suitable for this application and has a still considerably lower power consumption. Particularly this valve may be used in the application of a vacuum, such as in an automatic removing apparatus for a milking set of a milking machine. Such a removing apparatus is e.g. known from the EP-B-0097395.

Due to the still lower power comsumption the current may be supplied by small batteries, so that the cow shed needs not to be provided with electric conduits permitting connecting the removing apparatus to all cow positions.

A purpose of the invention may be achieved with a valve of the type as mentioned above which is characterized in that the valve is a three-way valve and the valve carrier 6 is movable by hand (22) against the force of the spring 18 into the one valve position in which the permanent magnet 14 is retained due to the influence of the soft iron core 15 of the solenoid 15, 16, the fluid conduits 4, 5 opening into apertures 2, 3 in a planar surface of a connection block 1 and the valve body 7 being cup shaped and of such dimensions and shape that it communicates in the other valve position the outlet apertures 2, 3 mutually, while sealing against the planar surface, the valve carrier being a lever 6 pivotable around a pivot 13 provided in the connection block 1, the valve body 7 being secured adjacent to the pivot 13 to said lever, the permanent magnet 14 being secured to the end of the lever 6, which is remote from the pivot 13.

In the known valve a high current pulse through the solenoid is necessary for opening the valve against the spring force. Said high current pulse affects the useful life of the batteries in negative sense, whereas also after some time, due to increase of the inner resistance, the battery is no longer able to deliver such current pulse value. According to the invention the permanent magnet may be engaged by hand with the solenoid core so that the solenoid needs only to be energized for the repelling of this magnet. Moreover, attracting the magnet is only possible with the known valve through a small distance and therefore not through the necessary large distance as necessary for the three-way valve of the invention.

Furthermore in the known valve the valve carrier is exposed to the fluid that is being controlled, so that iron or steel particles may adhere to the permanent magnet, which disadvantageously affects reliable operation thereof.

Since the cup shaped valve body is moved transversely to the spring force and also transversely to the force as caused by the pressure difference between the fluid conduits, the hand force or the spring force as required for moving the valve are only small, since only a friction force has to be surmounted. If the connection block and the valve body are manufactured from materials, the combination of which produces very little friction when moving them in mutual engagement, this brings the possibility to further decrease the said current pulse. Contrary thereto the known valve has to be opened by the solenoid against the spring force for which much more work has to be done, which translates into larger power consumption.

By selecting the lever length large relative to the distance between the valve body and the pivot, the spring force for moving it may be even smaller and thereby also the adhesive force of the permanent magnet, so that a still smaller current pulse in the solenoid is necessary for repelling the permanent magnet so that the power consumption is even less.

In the illustrated preferred embodiment the permanent magnet and the solenoid are constructed as single pole magnets which are inexpensive. It would also be possible to construct said parts with double poles, whereby a much more closed magnetic circuit is obtained and the power consumption is again less. However, said construction is considerably more expensive and is not necessary because of the fact that the power consumption is already very low. Furthermore it is also possible to switch off the valve by hand, e.g. with a cow suffering from mastitis (udder inflammation) which must not be milked exhausively. In the special embodiment of the valve, which is meant for insertion in an apparatus for removing a milking set of a milking machine, the one fluid conduit, connected to the valve, is the vacuum conduit of the milking machine and another fluid carrying conduit is the conduit connected with an actuating chamber for the lifting means of the removing apparatus.

Further advantageous details of the valve according to the invention appear from further sub-claims.

The invention will be further illustrated with reference to the drawing, showing an embodiment of the valve according to the invention, serving as an example only.

Figure 1:
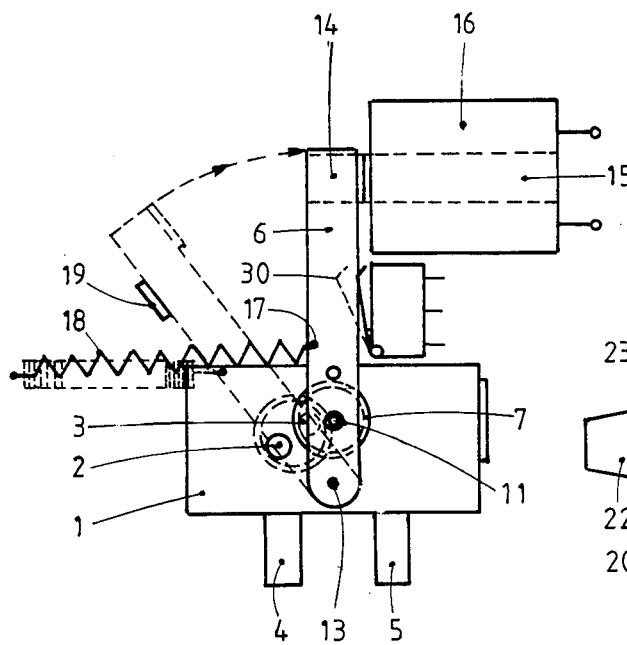
FIG. 1 is a schematic elevation of the valve.

In FIG. 1 a connection block 1 is shown in which bores 2, 3 open into the planar surface in the plane of the drawing, said bores constituting the outlet apertures of two fluid conduits, which may be connected through connectors 4, 5 on the side of the block 1.

In the embodiment shown the operating means for the three-way valve is constituted by a lever to which a cup shaped valve body 7 is connected. Said valve body may be seen in side elevation in FIG. 2 and is cup shaped having a bottom 8 and a peripheral edge 9 extending from said bottom towards the block 1. Centrally the bottom 8 carries at the side remote from the peripheral edge 9 a pin shaped projection 10 engaging in a corresponding hole 11 in the lever 6. A compression spring 12 may be provided between the bottom 8 and the lever 6. Thereby the valve body is always resiliently in engagement with the planar surface of the connection block 1, so that the peripheral edge 9 seals well with reference to this block. The lever 6 has a pivot 13 pivotally connecting the lever to the block 1.

Figure 3:
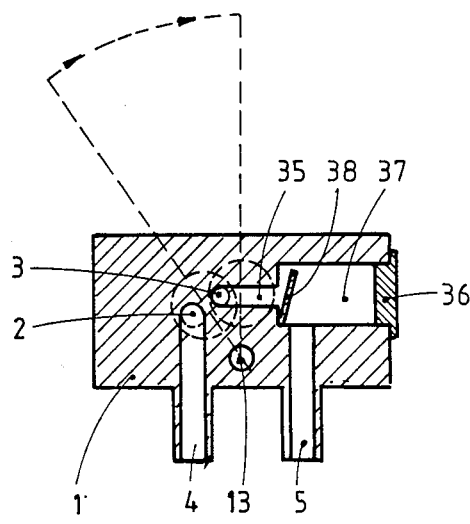
FIG. 3 shows a cross-section along the line III—III in FIG. 2.

The end of the lever 6 remote from the pivot 13, carries a permanent magnet 14. In the position shown in FIG. 1 with full lines the permanent magnet 14 is retained under the influence of a soft iron core 15 of a solenoid coil 16. One end of a tensioning spring 18 is connected in a point 17 situated between the valve body 7 and the magnet 14 whereas the other end of the spring is connected to a stationary point of the housing (not shown) of the apparatus. It would be possible to interchange the positions of the magnet 14 and the solenoid 15, 16. In the position shown with full lines in FIG. 1 the valve body 7 closes the outlet aperture 3 in the block 1 and in the position shown in FIG. 1 with broken lines, in which the lever 6 engages a stationary abutment 19, the valve body 7 covers both apertures 2 and 3 and mutually connects them. It appears from the cross-section in FIG. 3 that the aperture 2 is connected within the block 1 with the connector 4 and that the aperture 3 is connected with the connector 5.

Figure 2:
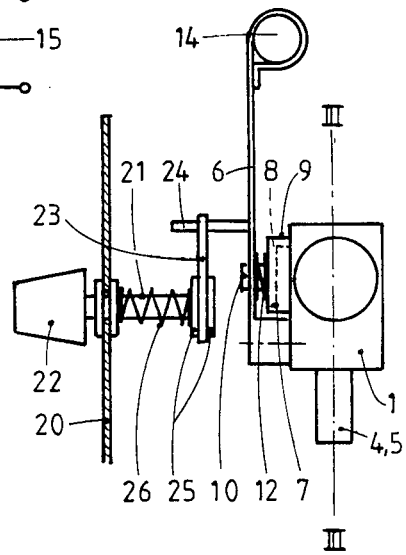
FIG. 2 is a side view as seen from the right in FIG. 1.

It appears further from FIG. 2 that in the apparatus housing, a wall of which is indicated with reference number 20, a small shaft 21 is rotatably provided in said wall, said shaft carrying at its end projecting being the housing a knob 22 and at its other end a crank 23. Said crank in the position shown engages a projection 24 secured to the lever 6 and extending perpendicularly therefrom. In this position the lever 6 is retained in that the permanent magnet 14 engages the core 15 of the solenoid. The lever may be moved from the position shown with broken lines in FIG. 1 by turning the knob 22 by hand into the position shown with full lines against the action of the spring 18.

Preferably a friction clutch is provided in the connection between the knob 22 and the crank 23 for preventing that by hand a too large force is imparted to the mechanism. Said friction clutch may be constructed e.g. such that the crank 23 is freely rotatable around the shaft 21 but is provided between two discs 25, the disc as shown to the right in FIG. 2 being secured to the shaft 21. The shaft 21 is in this case journalled in the wall 20 by two metal discs secured to the shaft, said discs being situated each at one side of the wall 20. A light compression spring 26 is provided between the innermost of said discs and the left one of both discs 25. Preferably the left disc 25 is manufactured from rubber. Thereby when the knob 22 is rotated the friction between both discs 25 and the crank 23, increased by the spring 26 carries along said crank 23 with the rotating shaft, but if a force is imparted exceeding the friction force, the connection slips.

In the rest condition of the valve device the lever 6 is drawn by the spring 18 against the abutment 19 and the outlet apertures 2, 3 are mutually connected. If now the operating chamber of the milking set removing apparatus, usually a chamber at one side of a piston, is connected through a hose (not shown) to the connector 4 and if the vacuum conduit of the milking machine is connected through a hose, not shown, to the connector 5, the vacuum is transmitted to the removing apparatus and this lifts the milking set. For applying the milking set to a cow, one turns the knob 22 such that the lever 6 is rotated against the force of the spring 18 to the right, as seen in FIG. 1, so that the magnet 14 is brought in engagement with the core 15. The spring 18 has been chosen such that its spring force is smaller than the attraction force between the magnet 14 and the core 15. By this lever movement the valve body 7 is placed in the position as shown with full lines in FIG. 1, whereby the aperture 2 is communicated with the atmosphere while the vacuum in the aperture 3 remains closed. In that thereby the vacuum in the removing apparatus is cancelled, the milking set moves downwardly so that it may be connected to the cow's udder.

When at the end of the milking process the milk quantity decreases, a milk flow indicator, not shown, produces through an electronic control device a current pulse in the coil of the solenoid 15, 16, such that the magnetic field generated thereby is stronger than and contrary to the field of the permanent magnet 14. Thereby the magnet 14 is repelled and the lever 6 moves due to the force of spring 18 through the previous or other valve position. Therein the apertures 2, 3 are again mutually connected by the valve body 7, so that the vacuum is admitted to the milking set removing apparatus and this lifts the milking set.

Figure 4:
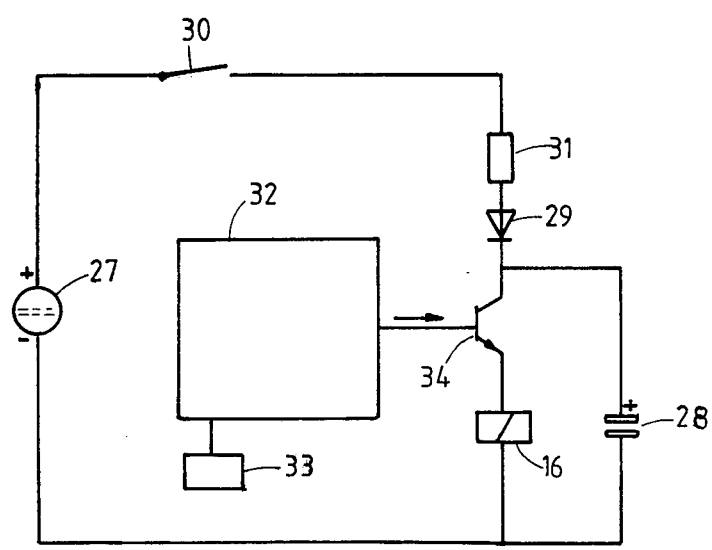
FIG. 4 shows the electric diagram for contolling the valve.

The current pulse for the coil 16 may be provided by one or more batteries connected in series, said batteries being indicated with the reference number 27 in the circuit diagram of FIG. 4. It is preferable to have the current pulse provided by a capacitor 28 which is shunted with the coil 16. In that case it is possible to gradually load the capacitor, which lengthens the useful life of the battery. A diode 29 is connected in series with the capacitor 28 in order to prevent unloading of the capacitor in the rest period of the device, in which the lever 6 is in engagement with the abutment 19.

Furthermore the circuit contains in the embodiment shown a switch 30. As soon as the lever 6 is rotated to the position to the right in FIG. 1, the switch closes, this switch also being indicated in FIG. 1, and the capacitor is loaded through a resistor 31 of high resistive value. This brings in combination with the capacitor a time constant value such that the loading time of the capacitor remains within the so-called first waiting time of the removing apparatus. For it is that if the apparatus is switched on by turning the lever 6 to the right and would one forget to apply the milking set to the cow, the apparatus is again switched off if no milk flows within 90 seconds. Because of this time constant value the battery has to issue only a very small current pulse when the apparatus is switched off by the control device 32. When issuing the current pulse the capacitor, moreover, will only partially be unloaded, so that after the very first loading for each next loading less energy is required.

The milking is controlled by an electronic control device 32 connected with the above mentioned milk flow indicator 33. At the end of the milking process said indicator 33 issues a signal to the control device 32, which in its turn issues a signal to a switching transistor 34. Thereby this transistor opens or becomes conductive and this results therein that the capacitor 28 can unload with a current pulse through the coil of the solenoid 15, 16. At that time the permanent magnet 14 is released, the lever 6 rotates to the left until it contacts the abutment 19, the vacuum is connected with the lifting device of the removing apparatus and simultaneously the switch 30 breaks the connection so that no longer current power from the battery 27 is used. It is to be noted that the use of the switch 30 is not indispensable. After these operations the removing apparatus is again in the rest condition and ready for application to a next cow.

As the material for the connecting block 1 a material is used which causes in combination with the material of the valve body 7 very little friction when the valve body moves along the block. The material of the connecting block e.g. may be celeron and that of the valve body may be ladulene, which both are materials known per se.

A further bore 35 extends in the connecting block 1, which is connected with the bore 3 and opens into a chamber 37 which is closed by a plug 36, said chamber 37 being in communication with the connector 5. If desired, a plate valve 38 e.g. of rubber is provided upstream of the outlet aperture of the channel 35 into the chamber 37, which blade valve operates as a check valve and serves to maintain the vacuum in the removing apparatus when the apparatus is transported from one cow position to another, during which the connection between the hose and the connector 5 is broken. This is particularly of interest with a removing apparatus according to EP-A-86201677 which has a bellowsshaped hose as the lifting means, because this then remains stiff and is easily transportable.

The valve according to the invention has the following advantages:

very low power consumption, thereby suitable for using inexpensive ordinary batteries, with low energy consumption, the valve still has a large flow rate, in spite of the small pressure difference (a vacuum of e.g. 15 mm) so that ample air may be supplied, e.g. for the removing apparatus, so that it is quickly lifted and again released, due to the rotating lever design a small magnet repelling force is necessary and low friction losses may be obtained.

the operation is simple by means of the single knob 22, the electronic device may provide for automatic switching off of the apparatus, so that this cannot be forgotten, the apparatus requires no maintenance, the valve is comprised of simple parts and may thereby easily and inexpensively be manufactured.

I claim:

1. A valve for opening and closing respectively the communication between at least two fluid carrying conduits in which different pressures prevail, said valve having a valve body connected to a valve carrier and which is movable into two positions, the valve carrier being under the influence of a spring and carrying a permanent magnet which in the one valve position is retained by the soft iron core of the solenoid, the coil of the solenoid being adapted to be supplied with a current pulse, so that the solenoid repulses the permanent magnet, so that under the influence of the spring the valve carrier is moved against an abutment in the other valve position, characterized in that the valve (7) is a three-way valve and the valve carrier (7) is adapted to be moved by hand (22) against the force of the spring (18) into the closed valve position, in which the permanent magnet (14) is retained under the influence of the soft iron core (15) of the solenoid (15, 16), the fluid conduits (4, 5) opening into apertures (2, 3) in a planar surface of a connection block (1) and the valve body (7) being cup shaped of such dimensions and shape that it mutually communicates in the other valve position the outlet apertures (2, 3) while sealing with the planar surface, the valve carrier being a lever (6), which is rotatable around a pivot (13) provided in the connection block (1), the valve body (7) being secured to said lever adjacent to its pivot (13), the permanent magnet (14) being secured to the end of the lever (6) which is remote from the pivot (13).

2. Valve according to claim 1, characterized in that the coil (16) of the solenoid (15, 16) is connected through a switching transistor (34) with one or more batteries (27), the switching transistor being connected to an electronic control device (32).

3. Valve according to claim 2, characterized in that a capacitor (28) is inserted in the control circuit of the solenoid coil (16), which capacitor is loaded by the battery or batteries (27) and due to a signal (33) in the control circuit sends a current pulse through the coil (16).

4. Valve according to claim 3 characterized in that the cup shaped valve body (7) is journalled by means of an integral pin (10) with clearance in a corresponding aperture in the lever (6).

5. Valve according to claim 4 characterized in that a compression spring (12) is provided around the pin (10) between the cup shaped valve body (7) and the lever (6).

6. Valve according to claim 5, characterized in that a knob (22) is provided on a shaft (21) carrying a crank (23), said knob being adapted for rotation of the lever (6) by hand, said crank being adapted to actuate a projection (24) on the lever (6) for moving the permanent magnet (14) into the influence of the soft iron core (15), a friction clutch (25) being provided in the connection between the knob (22) and the crank (23).

7. Valve according to claim 6, adapted for use in a removing apparatus for a milking set of a milking machine, characterized in that the one fluid conduit (5) connected to the valve is the vacuum conduit of the milking machine and another fluid carrying conduit (4) is a conduit connected to an actuation chamber of the lifting means of the removing apparatus.

* * * * *